B. GARVEY.
Levelling Instrument.
No. 34,298.
2 Sheets—Sheet 1.
Patented Feb. 4, 1862.
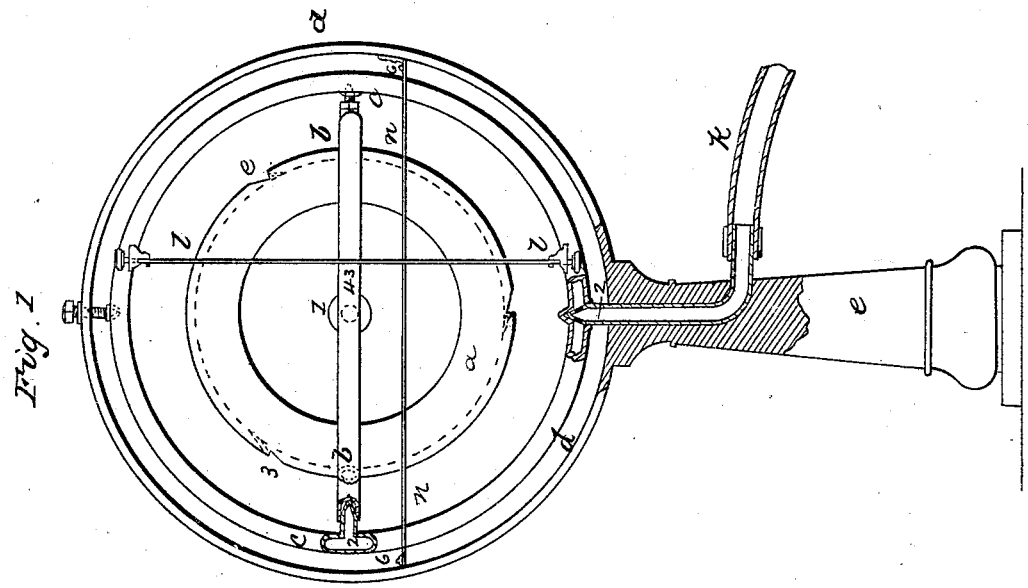
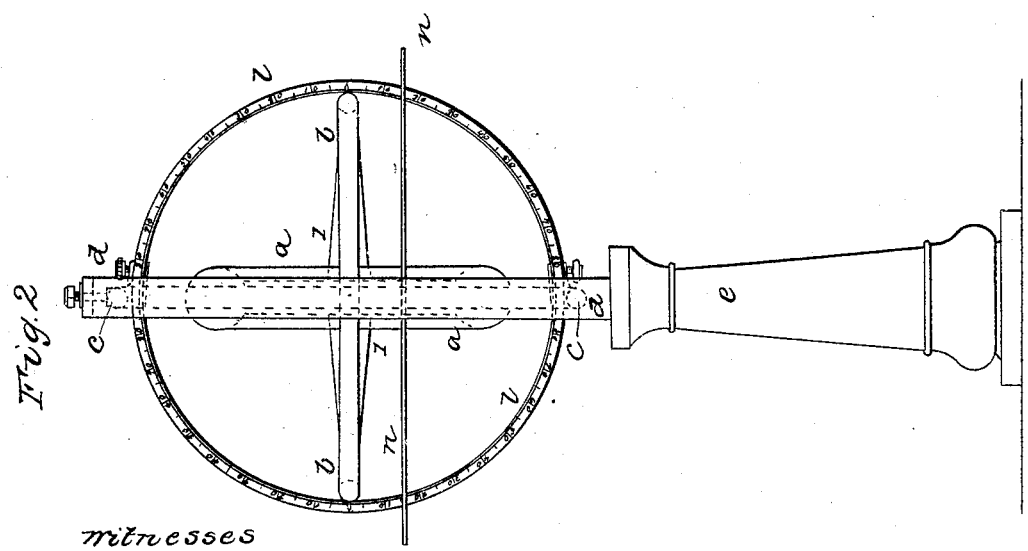
Witnesses
Lemuel W. Serrell
Thomas L. Dodds
Inventor
Benjamin Garvey

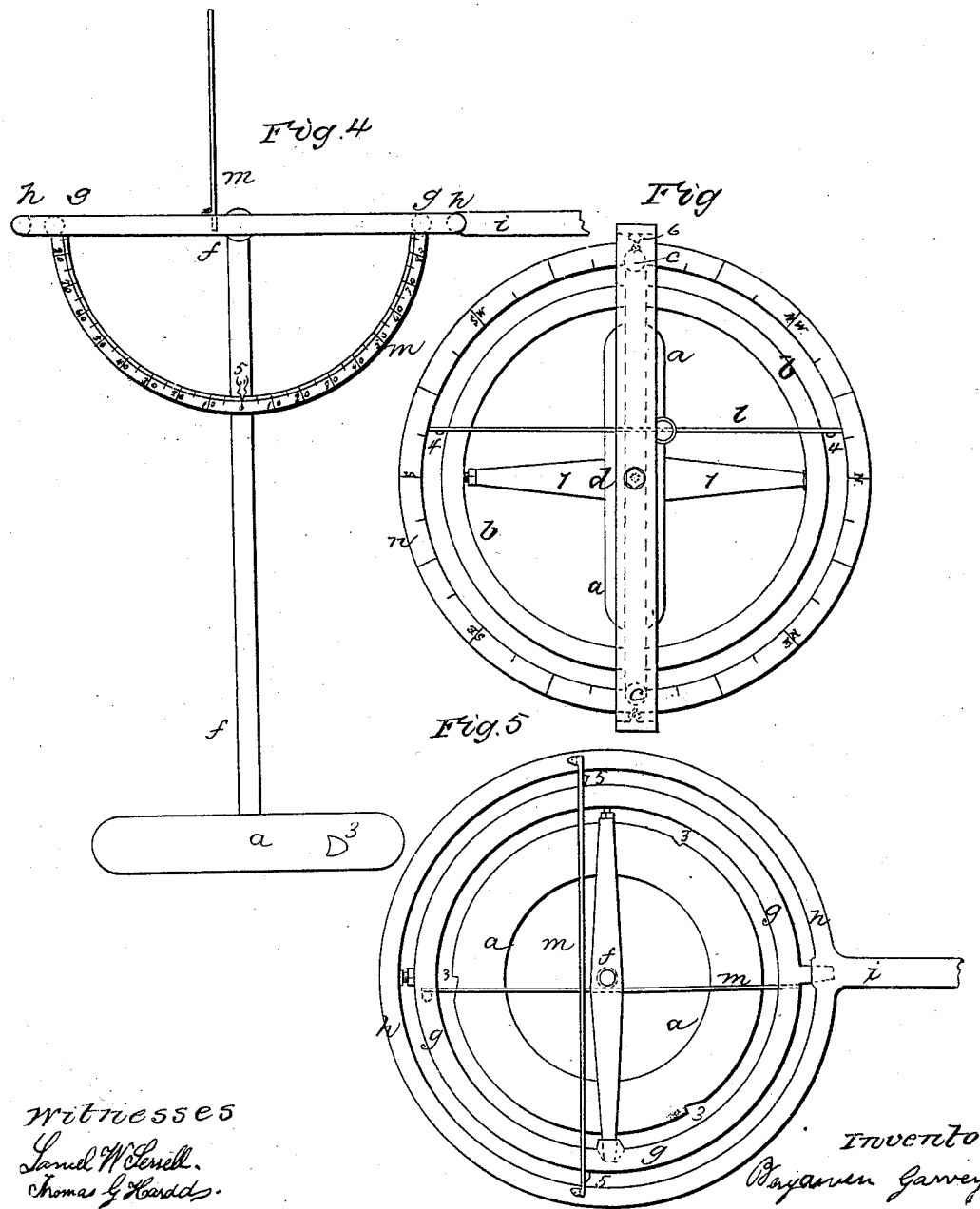

UNITED STATES PATENT OFFICE.

BENJAMIN GARVEY, OF ASHLAND, NEW YORK.

IMPROVEMENT IN ASCERTAINING POSITION AND DIRECTION ON LAND AND SEA.

Specification forming part of Letters Patent No. 34,298, dated February 4, 1862.

*To all whom it may concern:*

Be it known that I, BENJAMIN GARVEY, of Ashland, in Greene County and State of New York, have invented a new and useful Mode of Determining Position and Direction on Land and Sea; and I do hereby declare that the following is a full, and exact description thereof, reference being had to the herewith-accompanying drawings, and to the letters of reference marked thereon.

The nature of my invention consists in employing the inertia or momentum of masses of matter mounted so as to admit of the requisite motions independently of the rotation of the earth on its axis or of any other disturbing causes whatsoever and furnished with suitable contrivances for angular measurement, and also kept rotating by any suitable application of power to preserve normal or base planes and lines for the purpose of indicating the direction and changes of direction of other planes and lines, such as the absolute direction of a vertical line and the changes in that direction caused by the rotation of the earth on its axis or by changing the latitude or longitude of the apparatus, and such, also, as the direction of the course in which the apparatus is being moved or carried at any time and the changes in that direction referred either to a horizontal or vertical plane, &c.

To enable others skilled in the art to apply and use my invention, I will proceed to describe the construction and operation of suitable apparatus, modifications of which readily suggest themselves when required, and to show how it is used in astronomy, in navigation, and in geodesy, &c.

I make my apparatus of any size or shape and of any material which the duty to be performed by it suggests, making and combining all the parts thereof by any of the processes or contrivances known in the arts.

I use a fly-wheel $a\,a$, Figures 1, 2, 3, 4, and 5, or its equivalent, comparatively heavy in its rim or periphery, so that when rotating rapidly it resists by the force of its inertia or momentum any force tending to alter the plane of its rotation. To prevent the fly-wheel $a\,a$ being acted upon by any force which would tend to alter the plane of its rotation, I mount it within concentric rings or gimbals $b\,c\,d$, Figs. 1, 2, and 3, supported by a stand $e$, Figs. 1 and 2, or I suspend it by a long axle $f\,f$, Figs. 4 and 5, from a universal joint $g\,h$, supported by a suitable arm $i$, taking care to have the fly-wheel and its mountings uniformly balanced and to lessen the friction at the joints as much as possible. Through the substance of the fly-wheel $a\,a$, of its axle 1 1, of the rings or gimbals $b\,c\,d$, and of the stand $e$, Figs. 1 and 2, or of the universal joint $g\,h$ and arms $i$, Figs. 4 and 5, I make air or steam passages 2 2, which I connect by means of a tube $k$, Fig. 1, with a reservoir of compressed air or with a steam-boiler or with some other suitable source of power, so that there is a free passage for air, steam, &c., through the tube $k$, stand $e$, (or arm $i$, Fig. 4,) rings or gimbals $b\,c\,d$, axle 1, fly-wheel $a\,a$, &c., to vents 3 3 3, Fig. 1, in the rim or periphery of the fly-wheel. To the inner ring or gimbal $b\,b$, I attach an indicator 4 4, Figs. 1, 2, and 3, and to the middle ring or gimbal $c\,c$, I attach a graduated circle $l\,l$, Figs. 1, 2, and 3, so that it is at right angles to the plane of the fly-wheel $a\,a$ and that it can be adjusted so as to indicate any required graduation marked on it; or to the long axle $f\,f$ and ring $g\,g$, Figs. 4 and 5, I attach indicators 5 5, free to slide around graduated semicircles $m\,m$. These graduated semicircles I attach at right angles to each other and concentric with the universal joint $g\,h$, so as to allow each part $g\,h$ of the universal joint to oscillate in a plane at right angles to its diameter, or I attach a compass-card $n\,n$, Fig. 1, to the middle ring or gimbal $c\,c$ and an indicator 6 6 to the outer ring $d$, or I use any other known contrivance for angular measurement, selecting that which suits the object for which the apparatus is intended. I also connect with the fly-wheel a governor to regulate the escape of air or steam, &c.; but as there are several contrivances applicable to this purpose known and in use I do not describe it. I then protect the whole apparatus from the action of external disturbing forces by a shade made of glass or other material, having a hole or passage through it for the tube.

The operation of this apparatus is as follows, viz: When air or steam, &c., is turned on, it passes through the tube $k$, stand $e$, rings $b\,c$, axle 1, fly-wheel $a\,a$, &c., and escapes at the vents 3 3 3. It thus causes the fly-wheel to rotate after the manner of Hero's engine or Barker's mill, &c. So long as this force acts upon it the fly-wheel will continue to rotate in the same plane unless some force acts upon it and gives it motion in some other plane; but the shade protects it from the action of all external forces except such as act through the stand, and any force which acts through the stand acts on the center of the fly-wheel and does not affect the plane of its rotation; also, the only disturbing force within the apparatus is the friction at the axles of the rings or gimbals. This is too minute to be appreciable; but should it be found to cause any disturbance it can be neutralized by using two fly-wheels mounted on the same axle and set rotating in opposite directions. Then though in moving the apparatus from place to place the fly-wheel alters the absolute plane of its rotation it still rotates in a plane parallel to that in which it was at first set in motion and furnishes a base from which the direction and changes in direction of other planes and of lines can be measured.

Having now described the construction and the operation of suitable apparatus, I will next give directions for applying it to useful purposes.

First. To render the rotation of the earth visible and to measure time by it, set the fly-wheel $a$, Figs. 1, 2, and 3, rotating in the plane of the meridian and set the graduated circle (or dial) to the exact time or zero-point. Then as the graduated circle rotates with the earth and as the index is at rest relatively to the graduations a varying angle is indicated, which is at once a measure of the angular motion of the meridian and a measure of time.

Second. To measure changes in the latitude of the apparatus caused by moving it from place to place, set the fly-wheel $a$, Figs. 1, 2, and 3, rotating in a plane parallel to that of the equator and set the graduated circle to the graduation corresponding to the latitude of the place. Then in moving the apparatus from place to place keep the same radius of the graduated circle always vertical and the angle indicated at any instant will be the latitude of the apparatus at that time.

Third. To measure changes in the longitude of the apparatus caused by moving it from place to place, set the fly-wheel $a$, Figs. 1, 2, and 3, rotating in the plane of the meridian (as in the first instance) and set the graduated circle to the time indicated by a marine chronometer regulated to the sidereal time of the first meridian. Then in moving the apparatus from place to place keep the same radius of the graduated circle (or dial) always vertical, (as in the second instance,) and if there be a change in its longitude there will be a corresponding change in the time which it indicates, the time being quicker than that indicated by the chronometer when the longitude is eastern and being slower when the longitude is western; also, the difference between the two indications of time when reduced to units of angular measurement is the longitude of the apparatus. If the apparatus be set to indicate the sidereal time of its position, while the chronometer is regulated to that of some other meridian, then the longitude will be indicated in reference to the meridian to which the chronometer is regulated.

Fourth. To indicate the horizontal direction of the course in which the apparatus is being moved, set the fly-wheel $a$, Figs. 1, 2, and 3, rotating in a plane parallel to the equator, (as in the second instance.) Then its axle will point truly north and south, and the compass-card $n$ $n$, attached to the middle ring or gimbal, when set parallel to the horizon, will indicate the direction of the course. I employ the fly-wheel thus adjusted to govern the motion of the pencil or of the paper in a machine for drawing maps.

Fifth. To indicate the direction of the course in a vertical plane, use the fly-wheel $a$, suspended from a universal joint $g$ $h$, as shown in Figs. 4 and 5, and set it rotating, when its weight will keep its plane parallel to the horizon and its rotary momentum will prevent the action of any disturbing force—such as the jolting of a wagon or the tossing of a ship, &c.; also, the sliding indicators 5 5 will show the angle of elevation or depression of the course. I employ this apparatus thus arranged to govern the motion of a pencil or of the paper in a machine for grade delineation. I also employ it for preserving a horizontal platform for other forms of the apparatus to stand upon.

Sixth. To determine the course and position of the apparatus as it is moved from place to place on shipboard or other mode of conveyance, use the arrangement described in the last instance to keep a platform level and that described in the fourth instance to indicate the latitude and at the same time to keep a meridian line marked on the platform in its true position, thus indicating the course, (the friction being lessened by employing mercury or friction-rollers, &c.;) also use the arrangement as in the third instance to indicate the longitude. Then, the direction of the course being known, together with the latitude and longitude, the position, &c., of the vessel or wagon are ascertained.

These applications will readily suggest others; also, I have described only one method of giving rotation to the fly-wheel; but I sometimes employ electricity, electro-magnetism, and endless band gearing, springs, and other applications of air, steam, gas, &c., for that purpose. These, however, being known and in use for similar purposes, need not be specified.

I do not claim as my invention a method of illustrating the precession of the equinoxes or of causing a rotating body to support its own weight on a point in a paradoxical manner or of exhibiting the combination of two rotations by means of a fly-wheel set in motion by the forcible unwinding of a string from its axle, for that method is employed for such purposes in the instrument known as the "gyroscope;" nor do I claim the method of keeping a wheel rotating by the emission of steam, &c., from vents in its rim or periphery, for that is already done in Hero's steam-engine; but What I do claim as my invention, and desire to secure by Letters Patent, is—

The application of rotating bodies to the purpose of preserving normal or base lines and planes, whereby the direction and changes of direction of other planes and lines can be ascertained, for the purposes and in the manner set forth, substantially, in my herewith-accompanying specification.

Dated, in the city of New York, this 26th day of October, A. D. 1857.

BENJAMIN GARVEY.

Witnesses:
GEO. B. GRANNISS,
GEO. H. GRANNISS.